United States Patent [19]

Okuda et al.

[11] 4,222,769

[45] Sep. 16, 1980

[54] PROCESS OF REGENERATING AND RECOVERING LEAD SULPHATE-CONTAINING WASTES

[75] Inventors: Masaaki Okuda, Uozu; Kiyotaka Tomisaki, Toyama, both of Japan

[73] Assignee: Diamon Engineering Co., Ltd., Japan

[21] Appl. No.: 971,827

[22] Filed: Dec. 19, 1978

[30] Foreign Application Priority Data

Jan. 6, 1978 [JP] Japan ..................................... 53-257

[51] Int. Cl.$^2$ ............................................. C22B 13/04
[52] U.S. Cl. ......................................... 75/120; 75/77; 75/115; 423/92; 423/104
[58] Field of Search ........................... 75/120, 77, 115; 423/92, 104

[56] References Cited

U.S. PATENT DOCUMENTS

| | | | |
|---|---|---|---|
| 1,343,656 | 6/1920 | Cavers | 75/77 |
| 1,430,269 | 9/1922 | Waring | 75/120 X |
| 2,065,408 | 12/1936 | Swendsen | 75/120 X |
| 3,689,253 | 9/1972 | Dorenfeld et al. | 75/120 X |
| 3,883,348 | 5/1975 | Acoveno et al. | 423/92 X |
| 3,940,265 | 2/1976 | Wilson | 75/77 |
| 4,118,219 | 10/1978 | Elmore et al. | 75/103 |

FOREIGN PATENT DOCUMENTS

2706056  1/1977  Fed. Rep. of Germany.

*Primary Examiner*—G. Ozaki
*Attorney, Agent, or Firm*—Wenderoth, Lind & Ponack

[57] ABSTRACT

A process of regenerating and recovering lead from lead sulphate-containing wastes which comprises (i) contacting the lead battery scrap with an aqueous solution of ammonium carbonate to form lead carbonate and ammonium sulphate, (ii) subjecting the solid phase containing the lead carbonate obtained by solid-liquid separation of the reaction product so formed to roast-reduction at a temperature ranging from about 350° C. to about 700° C. in the presence of a carbon material reducing agent to generate and recover the lead, (iii) double decomposing the liquid phase containing the ammonium sulphate obtained by said solid-liquid separation by the addition of calcium hydroxide in an amount such that the molar ratio of the calcium hydroxide added, expressed as Ca(OH)$_2$/(NH$_4$)$_2$SO$_4$, is about 1.05 to about 1.90 and that the concentration of a calcium sulfate slurry formed as a by-product is about 5 to about 10%, and further contacting ammonium hydroxide thus formed with carbon dioxide gas, to recover ammonium carbonate in a form of an aqueous solution for reuse in said contacting step (i), and (iv) recycling the aqueous ammonium carbonate solution of step (iii) to step (i).

6 Claims, No Drawings

PROCESS OF REGENERATING AND RECOVERING LEAD SULPHATE-CONTAINING WASTES

The instant invention relates to an improved process capable of regenerating and recovering high purity lead low in cost. This process offers the commercial advantage of avoiding waste gas disposal and provides excellent recovery of lead from lead sulphate-containing wastes, such as battery scrap, smoke ash at the time of smelting lead and so on, by extremely simple means and operations.

More particularly, the instant invention relates to a process of regenerating and recovering lead from lead sulphate-containing wastes which comprises (i) contacting a lead sulphate-containing waste with an aqueous solution of an alkaline substance both capable of transforming said lead sulphate into a sparingly water-soluble or water-insoluble lead salt and capable of producing a readily water-soluble or water-soluble sulphate as by-product, preferably an alkaline substance selected from the group consisting of sodium hydroxide, ammonia, sodium carbonate and ammonium carbonate, to form a reaction product containing a sparingly water-soluble or water-insoluble lead salt, such as lead oxide, lead hydroxide, lead carbonate etc., and a readily water-soluble or water-soluble sulphate, such as sodium sulphate, ammonium sulphate etc.

(ii) subjecting to roast-reduction by means known per se, the solid phase obtained by solid-liquid separation of the reaction product so formed, such as lead oxide, lead hydroxide, carbonate etc. to regenerate and recover lead and (iii) double decomposing liquid phase obtained by said solid-liquid separation to recover said alkaline substance in the form of an aqueous solution for reuse in said contact step of (i). Conventionally, dry systems have been practically employed for the regeneration and recovery of lead from lead sulphate-containing wastes, and for instance, there is carried out a process of regenerating and recovering lead by melt-reduction of lead sulphate-containing wastes in the copresence of a reducing agent, such as carbon, and a desulphurization assistant, such as iron. The said melt-reduction system can be briefly expressed by formulae to follow:

$$PbSO_4 + 2C \rightarrow PbS + 2CO_2 \uparrow$$

$$PbS + 2bO \rightarrow 3Pb + SO_2 \uparrow$$

$$PbS + 7PbSO_4 \rightarrow 4[PbSO_4.PbO] + 4SO_2 \uparrow$$

$$3PbS + 2[PbSO_4.PbO] \rightarrow 7Pb + 5SO_2 \uparrow$$

$$PbS + Fe \rightarrow Pb + FeS$$

In effect, however, it is regarded as a complex reaction in which many reactions occur competively as shown by following formulae:

$$PbSO_4 + 4C \rightarrow PbS + 4CO \uparrow \quad (1)$$

$$2PbSO_4 + CO \rightarrow PbO.PbSO_4 + CO_2 + SO_2 \uparrow \quad (2)$$

$$PbO.PbSO_4 + 3CO \rightarrow 2Pb + 3CO_2 + SO_2 \uparrow \quad (3)$$

$$PbS + PbSO_4 \rightarrow 2Pb + 2SO_2 \uparrow \quad (4)$$

$$PbS + 2PbO \rightarrow 3Pb + SO_2 \uparrow \quad (5)$$

$$3PbS + 2(PbO.PbSO_4) \rightarrow 7Pb + 5SO_2 \uparrow \quad (6)$$

$$PbO + CO \rightarrow Pb + CO_2 \uparrow \quad (7)$$

$$PbSO_4 + 4CO \rightarrow PbS + 4CO_2 \uparrow \quad (8)$$

$$7PbSO_4 + PbS \rightarrow 4(PbO.PbSO_4) + 4SO_2 \uparrow \quad (9)$$

$$PbSO_4 + 2CO \rightarrow Pb + 2CO_2 + SO_2 \uparrow \quad (10)$$

$$PbS + Fe \rightarrow Pb + FeS \quad (11)$$

$$PbO + C \rightarrow Pb + CO \uparrow \quad (12)$$

$$PbSO_4 \rightarrow PbO + SO_3 \uparrow \quad (13)$$

Considerable sulphur oxide and other malodorous or noxious compounds and dust occur. Disposal of a large amount of these waste gases causes many troubles in the operation and apparatus. Furthermore, because of direct melt-reduction reaction of sulphate, even if a flux is utilized, conditions for application of heat as high as as about 1200° C. are still required. This is markedly disadvantageous. Added to this, high recovery cannot be expected due to the above complicated reaction mechanism. Moreover, it involves consumption of large amounts of reducing agent, desulphurization assistant, flux etc. Thus, such procedure is high in cost and disadvantageous from the standpoint of regeneration and recovery means.

U.S. Pat. No. 3,940,265 has proposed what is known as and which can be called the semi-wet system, for the purpose of avoiding such disadvantages as with the above-discussed prior art process. In this procedure, lead is recovered and dreg slags are discarded by means comprising: a first step of reacting lead sulphate-containing wastes with an aqueous slurry of calcium hydroxide according to the following formula:

$$PbSO_4 + Ca(OH)_2 + H_2O \rightarrow PbO + CaSO_4.2H_2O$$

Thus forming an aqueous slurry of lead oxide and calcium sulphate, a second step of subsequently separating said aqueous slurry by solid-liquid separating means for collection and drying of the solid phase part and a third step of subjecting the dried mixture of lead oxide and calcium sulphate obtained in said second step to roast-reduction at temperatures on the order of about 600°–700° C. together with a reducing agent, carbon, in the presence of a KCl—NaCl flux for reduction of lead oxide to lead.

In this process, roast-reduction of lead oxide is necessarily effected in the copresence of calcium sulphate since lead oxide and calcium sulphate formed in the first step settle together and are inseparable from each other. The coexistence of this calcium sulphate hinders the coalescence of lead formed by reduction, and hence, the said proposal teaches the said melt-reduction operation to be effected at quantitative proportions so adjusted as to form a ternary eutectic mixture of the said KCl—NaCl flux and calcium sulphate.

In the process of this proposal, it is true that the pollution and high thermal requirements of melt-reduction, mentioned above, are somewhat minimized, but it inevitably entails other disadvantages or drawbacks such as difficulties accompanying the roast-reduction in the copresence of calcium sulphate, as well as the use of a flux, the need for the formation of a ternary eutectic mixture and, further, occurrence of dreg slags. Moreover, there are restrictions on the improvement of lead purity by interfacial diffusion between the reduced melted lead phase and the ternary eutectic mixture phase, as well as in the improvement of yield. In addition, it entails problems such as causing noxious gas to occur with the decomposition at high flux temperatures.

The instant inventors have studied the provision of a process capable of regenerating and recovering high purity lead to commercial advantage in excellent recovery from lead sulphate-containing wastes, thus overcoming disadvantages or drawbacks of the process of U.S. Pat. No. 3,940,265 without the fear of pollution or thermal disadvantage and by simple operations.

As a consequence, it has been found possible to employ a means based on the totally different technical concept from that of U.S. Pat. No. 3,940,265, viz., a new means both capable of precipitating the converted lead compound alone out of an treatment system with the alkaline substance in the form of a water-insoluble solid phase and capable of recovering the alkaline substance from the liquid phase to be reused, i.e. for the said treatment system, in treating lead sulphate-containing wastes with an aqueous alkaline substance solution to convert said lead sulphate into a lead compound taking a more advantageous form for the roast-reduction. It was further discovered that by this means, the various disadvantages of the prior art process in subjecting lead sulphate to direct reduction-treatment and the other disadvantages or drawbacks of U.S. Pat. No. 3,940,265 could be overcome simultaneously.

Therefore, the purpose of the instant invention is to provide a process for the regeneration and recovery of lead from lead sulphate-containing wastes capable of recovering high purity lead from lead sulphate-containing wastes in excellent recovery to marked commercial advantage.

The said purpose of the instant invention, as well as many other purposes and advantages will be made clear from the description to follow.

According to the process of the instant invention, in alkali treatment to contact lead sulphate-containing wastes, such as battery scraps and smoke ash at the time of smelting lead, with an aqueous alkaline substance solution for converting said lead sulphate to a more readily roast-reducible lead compound, the alkali treatment is effected with an aqueous alkali solution both capable of converting lead sulphate in the lead sulphate-containing waste into a readily roast-reducible and sparingly water-soluble lead salt and also capable of producing a water-soluble sulphate as by-product. The reaction product system so formed can readily be separated into a solid phase and liquid phase by optional solid-liquid separating means. The solid phase obtained, viz., the readily roast-reducible sparingly water-soluble lead salt phase, is roast-reduced by means known per se for the regeneration and recovery of lead. Whereas the alkaline substance is recovered in the form of an aqueous solution by means of double decomposition from the liquid phase obtained. It is optionally dehydrated and redissolved in water to reused in the said alkali treatment. This way there can be provided a markedly excellent new process for the regeneration and recovery of lead from lead sulphate-containing wastes which has been desired, but could never have been achieved by those skilled in the art.

In the process of the instant invention, as alkaline substances usable for the said alkali treatment optional alkaline substances can be utilized which are both capable of converting lead sulphate to a sparingly water-soluble lead salt and are capable of capturing sulphate ions split off from the said lead sulphate for the formation of water-soluble sulphate as by-product. It is not permissible to make use of alkaline substances which produce sparingly water-soluble or water-insoluble sulfates such as calcium hydroxide used in the said improved proposal of U.S. Pat. No. 3,940,265.

As suitable alkaline substances, for instance, sodium hydroxide, ammonia, sodium carbonate, ammonium carbonate etc. can be listed. These are used in a form of an an aqueous solution, such as aqueous sodium hydroxide solution, aqueous ammonia (ammonium hydroxide), aqueous sodium carbonate solution, aqueous ammonium carbonate solution etc. Among these, the use of ammonium carbonate is particularly preferred e.g. for the following reasons:

(1) It is free from elution into liquid phase of lead component in alkali treatment, and the reaction proceeds quantitatively as well as in high yield.

(2) It provides a means which is easy to perform, is low in cost and permits the recovery of alkaline substances by means of double decomposition of water-soluble (or readily water-soluble) sulphate by-product.

(3) It becomes possible to recover and reuse the carbonic acid radical of the sparingly water-soluble (or water-insoluble) lead salt formed.

According to the process of the instant invention, lead sulphate-containing wastes, such as battery scraps and smoke ash at the time of smelting lead, are contacted with an aqueous alkaline substance solution as illustrated above. The contact can readily be made, for instance, by immersing said wastes into said aqueous alkaline substance solution. Room temperature will suffice for the immersion temperature. It is not necessary to particularly use a heating or cooling means, but such means may optionally be employed. With this alkali treatment there is formed a sparingly water-soluble or water-insoluble lead compound, such as lead oxide, lead hydroxide, lead carbonate and so on, as shown by the formula to follow, and at the same time, sulphate ions are captured by alkali to form readily water-soluble or water-soluble sulphate as by-product.

NaOH process:

$$PbSO_4 + 2NaOH \rightarrow PbO \downarrow + Na_2SO_4 + H_2O$$

Na$_2$CO$_3$ process:
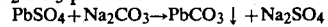
$$PbSO_4 + Na_2CO_3 \rightarrow PbCO_3 \downarrow + Na_2SO_4$$

NH$_4$OH process:
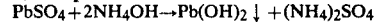
$$PbSO_4 + 2NH_4OH \rightarrow Pb(OH)_2 \downarrow + (NH_4)_2SO_4$$

(NH$_4$)$_2$CO$_3$ process:
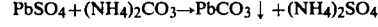
$$PbSO_4 + (NH_4)_2CO_3 \rightarrow PbCO_3 \downarrow + (NH_4)_2SO_4$$

According to the instant invention the reaction product system containing a sparingly water-soluble (or water-insoluble) lead salt and a water-soluble (or readily water-soluble) sulphate by-product as illustrated above is separated into solid phase and liquid phase by optional solid-liquid separating means, such as filtration, decantation, centrifugation and other means. The solid phase so obtained is optionally cleansed and dried and is then subjected to roast-reduction treatment together with a carbon material reducing agent, such as coke, by means known per se., such as blast combustion type furnace or electric furnace. This way, it can be conveniently reduced into lead and recovered with ease in high purity and by high yield, as well as at much lower temperature than in reduction in a form of lead sulphate and without entailing the fear of pollution. In the case, for instance, where the sparingly water-soluble lead salt formed is lead oxide, it can readily be reduced into lead at roast-reduction temperatures in the order of about 650°–about 700° C. In the case, on the other hand, of lead carbonate, likewise it can readily be decomposed into lead oxide and carbon dioxide gas at about 350°– about 400° C. With lead hydroxide, likewise it can readily be reduced into lead passing through lead oxide, or by preheating such as to make lead oxide in advance. Reduction proceeds quantitatively, and lead can be regenerated and recovered in excellent yield as well as in high purity.

In the process of the instant invention, the water-soluble sulphate-containing aqueous phase obtained by separation into solid phase and liquid phase as mentioned above is subjected to double decomposition means for the recovery of the alkaline substance. It can be reused in said alkali treatment step as such, or after addition of supplemental alkaline substance, or by once dehydrating to recover the alkaline substance as solids, followed by redissolving in water in a desired concentration. This makes the process of the instant invention commercially more advantageous. The process of the instant invention is clearly commercially advantageous in that the alkaline substances can be reused.

The recovery of the alkaline substance by double decomposition of liquid phase can be performed at room temperature and it could be effected without necessity of cooling or heating, in particular. The double decomposition means like that is in itself known and can be utilized in the process of the instant invention.

In the case, for instance, of the said NaOH process, sodium sulphate formed as by-product can be double-decomposed by means shown by the following formulae to recover NaOH with ease of reuse.

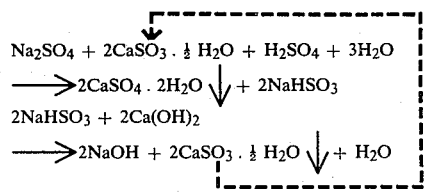

In the case of the said $Na_2CO_3$ process, NaOH obtained in the same way as with the said NaOH process is contacted with carbon dioxide gas to recover $Na_2CO_3$ according to the following formula, and it can be reused.

$$2NaOH + CO_2 \rightarrow Na_2CO_3 + H_2O$$

In the case, further, of the said $NH_4OH$ process, $(NH_4)_2SO_4$ formed as by-product is contacted with calcium hydroxide to recover $NH_4OH$ according to the following procedure for reuse.

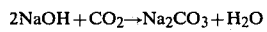
$(NH_4)_2SO_4 + Ca(OH)_2 + 2H_2O \rightarrow 2NH_4OH + CaSO_4.2H_2O$

Furthermore, in the case of the $(NH_4)_2CO_3$ process, the most preferred embodiment of the instant invention, $(NH_4)_2SO_4$ formed as by-product is contacted with $Ca(OH)_2$ in the same way as with the said $NH_4OH$ process into $NH_4OH$. After that, it is contacted with carbon dioxide gas to regenerate alkali by the following formula. It is recovered and available for reuse.

$$2NH_4OH + CO_2 \rightarrow (NH_4)_2CO_3 + H_2O$$

As the above, water-soluble sulphate formed as a by-product is readily double-decomposed and regenerated into an alkaline substance. It can be reused in treatment of lead sulphate-containing wastes.

Actual operation for the regeneration and recovery of alkali as the above can be effected by an operation known per se.

In the said NaOH process, for instance, sparingly water-soluble lead salt PbO and water-soluble sulphate $Na_2SO_4$-containing liquid phase formed are separated from each other, and then the water-soluble sulphate $Na_2SO_4$-containing liquid phase is subjected to treatment at conditions such as a temperature of about 30°–about 50° C., molar ratio of reactants added, as [$CaSO_3 \cdot \frac{1}{2}H_2O)/Na_2SO_4$]=about 2.05–about 2.90, and [$H_2SO_4/Na_2SO_4$]=about 1.02–about 1.20, reaction residence time of about 0.5–about 1.0 hour and calcium sulphate slurry concentration of about 5–about 10%. Sparingly soluble calcium sulphate and water-soluble acidic sodium sulphite formed are separated into solids and liquid, and then the water-soluble sulphite $NaHSO_3$-containing liquid phase is subjected to treatment at conditions such as a temperature of about 30°–about 60° C., molar ratio of calcium hydroxide added of [$Ca(OH)_2/NaHSO_3$]=about 1.02–about 1.80, reaction residence time of about 0.5–about 1.0 hour and calcium sulphite slurry concentration of about 5–about 10%. Sparingly soluble sulphite $CaSO_3 \cdot \frac{1}{2}H_2O$ and NaOH-containing liquid phase formed are separated from each other. The solid phase obtained is reused in the said double-decomposition first step reaction, whereby alkali recovery is effected.

In the case, for instance, of the said $Na_2CO_3$ process, regeneration and recovery of alkali can be effected by reaction of NaOH obtained in the same way as with the said NaOH process with carbon dioxide gas in such a manner as to bring the pH of the said aqueous alkali solution to 11.0–11.5 at room temperature by using a gas-liquid contact apparatus, such as a packing column.

Furthermore, in the case, for instance, of the said $NH_4OH$ process, sparingly water-soluble lead salt $Pb(OH)_2$ and water-soluble sulphate $(NH_4)_2SO_4$-containing liquid phase formed are separated from each other, and then the said liquid phase, for instance, is reacted with calcium hydroxide at conditions such as a temperature of about 28°–about 32° C., molar ratio, as calcium hydroxide added of [$Ca(OH)_2/(NH_4)_2SO_4$]=about 1.05–about 1.90, reaction residence time of about 0.5–about 1.0 hour and calcium sulphate slurry concentration of about 5–about 10%. Sparingly soluble sulphate $CaSO_4.2H_2O$ and $NH_4OH$-containing liquid phase formed are separated from each other. In this way, said alkali recovery can be effected.

Further, in the case of employing the said $(NH_4)_2CO_3$ process according to the preferred embodiment of the instant invention, $NH_4OH$ is recovered in the same way as mentioned in the said $NH_4OH$ process and then, the said $NH_4OH$-containing liquid phase, for instance, is reacted with carbon dioxide gas in such a manner as to bring the pH of the liquid phase to about 9–about 9.5, preferably at below about 35° C. by using a gas-liquid contact apparatus, such as a packing column whereby recovery and formation of $(NH_4)_2CO_3$ solution can be effected.

Several embodiments for the practice of the process of the instant invention will be further detailed by way of examples as follows.

EXAMPLE 1

2,714 g of battery waste polar plate milled below 80 mesh ($PbSO_4$ content 55.86%) was reacted with 17,304 g of 3% aqueous ammonium carbonate solution ($(NH_4)_2CO_3$: 504 g, $H_2O$; 16,800 g) at a reaction temperature of 25° C.–28° C. for a reaction time of 10–15 minutes. A reaction tank equipped with a stirrer was used for the reaction apparatus. On this occasion, lead sulphate conversion was nearly 100% according to chemical analyses and X-ray analyses, whereas the amount of lead eluted into the liquid phase was max. 5 ppm by atomic absorption analyses, and the amount of lead lost corresponding to 0.1% or less of the total lead amount.

The reaction product was separated into solids and liquid. The liquid phase was offered for the alkali regeneration and recovery step. The solid phase was pyrolyzed at 400° C. for 1.0 hour in a drum type rotary furnace and lead carbonate was converted to lead oxide. After that, it was mixed with powdered coke: 188 g and powdered limestone: 20 g and placed in the drum type rotary furnace to conduct the reduction reaction at about 700° C. for one hour. There are obtained reduction of 98% and lead recovery of 96%.

The liquid phase, on the other hand, was reacted with 445 g (addition mole ratio 1.2) of calcium hydroxide at reaction temperature of 25°–28° C. for reaction time of 0.5–1.0 hour by using a reaction tank equipped with a stirrer. $CaSO_4.2H_2O$ and $NH_4OH$-containing liquid phase formed on this occasion were separated into solids and liquid. The amount of the liquid phase obtained was 16,744 g ($NH_4OH$: 344 g, $H_2O$: 16,400 g).

Then the said $NH_4OH$-containing liquid phase was reacted with carbon dioxide gas having a concentration of about 10 vol.% at 22°–25° C. in such a manner as to bring the pH of the liquid phase to about 9 to about 9.5 by using a packing column. On this occasion, 16,950 g of ammonium carbonate solution ($(NH_4)_2CO_3$: 470 g, $H_2O$: 16,480 g) could be recovered and produced. There was obtained an ammonium carbonate recovery of 93%.

EXAMPLE 2

2,714 g of battery waste polar plate milled below 80 mesh ($PbSO_4$ content 55.86 wt.%) was suspended in 8,200 g of aqueous solution containing 410 g of NaOH and reacted under stirring at temperature of 25°–28° C. for 10–15 minutes. The reaction product formed was separated into solids and liquid by Buchner funnel to give about 2280 g of solid phase.

Chemical analyses and X-ray diffractions of the solid phase product showed that no sulphate was detected and that it was converted to PbO nearly quantitatively.

On the other hand, the Pb component eluted into the liquid phase was measured by the atomic absorption method, in consequence of which it was 0.2%, which corresponded to about 0.8% in the percentage of lead loss.

The said solid phase product was mixed in the same way as in Example 1 with 188 g of powdered coke and 20 g of powdered limestone to conduct the reduction reaction at about 700° C. for one hour in the drum type rotary furnace. There was obtained a reduction of 98% and lead recovery of 95%.

The liquid phase, on the other hand, was reacted with 1,343 g (addition mole ratio 2.1) of $CaSO_3.\frac{1}{2}H_2O$ and 534 g (addition mole ratio 1.1) of $H_2SO_4$ at a reaction temperature of 30°–35° C. for a reaction time of 0.5–1.0 hour by using a reaction tank equipped with a stirrer. $CaSO_4.2H_2O$ and $NaHSO_3$-containing liquid phase formed on this occasion were separated into solids and liquid. The amount of the liquid phase obtained was 8,430 g ($NaHSO_3$: 1,020 g, $H_2O$: 7,410 g). Then the said $NaHSO_3$-containing liquid phase was reacted with 800 g (addition mole ratio 1.1) of calcium hydroxide at reaction temperature of 30°–35° C. for reaction time of 0.5 to 1.0 hour by using the same reaction tank equipped with stirrer as the above. $CaSO_3.\frac{1}{2}H_2O$ and NaOH-containing liquid phase formed on this occasion were separated into solids and liquid. 7,790 g of liquid phase containing 388 g of NaOH and 1,253 g of $CaSO_3.\frac{1}{2}H_2O$ could be recovered and produced. There was obtained an NaOH recovery of 95% and $CaSO_3.\frac{1}{2}H_2O$ recovery of 93%.

EXAMPLE 3

2,241 g of smoke ash milled below 80 mesh ($PbSO_4$ content 67.5%) was reacted with 17,304 g of 3% aqueous ammonium carbonate solution ($(NH_4)_2CO_3$: 504 g, $H_2O$: 16,800 g) at reaction temperature of 25°–28° C. for reaction time of 10–15 minutes. The reaction tank equipped with stirrer was used as the reaction apparatus. Conversion of lead sulphate on this occasion was approximately 100% by chemical analyses and X-ray analyses.

The reaction product was separated into solid and liquid. The liquid phase was offered for the alkali regeneration step, whereas the solid phase was pyrolyzed at 400° C. for 1.0 hour in the drum type rotary furnace. Catalytically converted lead carbonate was transformed to lead oxide, then mixed with powdered coke: 126 g, powdered limestone: 9 g and placed in the drum rotary furnace to conduct the reduction reaction at 700° C. for one hour. There was obtained a reduction of 98.0% and lead recovery of 96.0%.

The liquid phase, on the other hand, was reacted in the same way as in Example 1 with 445 g (addition mole ratio 1.2) of calcium hydroxide at reaction temperature of 25°–28° C. for reaction a time of 0.5 to 1.0 hour by using a reaction tank equipped with stirrer. $CaSO_4.2H_2O$ and $NH_4OH$-containing liquid phase formed on this occasion were separated into solids and liquid, and the amount of the liquid phase obtained was 16,692 g ($NH_4OH$: 342 g, $H_2O$: 16,350 g).

Then the said $NH_4OH$-containing liquid phase was reacted with carbon dioxide gas having a concentration of about 10 vol.% at 22°–25° C. in such a manner as to bring the pH of the liquid phase to about 9 to about 9.5 by using the packing column.

On this occasion, 16,896 g of ammonium carbonate solution ($(NH_4)_2CO_3$: 466 g, $H_2O$: 16,430 g) could be recovered. The resultant ammonium carbonate recovery was 92%.

What is claimed is:

1. A process of regenerating and recovering lead from lead battery scrap which comprises
    (i) contacting the lead battery scrap with an aqueous solution of ammonium carbonate to form lead carbonate and ammonium sulphate, (ii) subjecting the solid phase containing the lead carbonate obtained by solid-liquid separation of the reaction product so formed to roast-reduction at a temperature ranging from about 350° C. to about 700° C. in the presence of a carbon material reducing agent to generate and recover the lead, (iii) double decomposing the liquid phase containing the ammonium sulphate obtained by said solid-liquid separation by the addition of calcium hydroxide in an amount such that the molar ratio of the calcium hydroxide added, expressed as $Ca(OH)_2/(NH_4)_2SO_4$ is about 1.05 to about 1.90 and that the concentration of a calcium sulfate slurry formed as by-product is about 5 to about 10%, and further contacting ammonium hydroxide thus formed with carbon dioxide gas, to recover ammonium carbonate in a form of an aqueous solution for reuse in said contacting step (i), and (iv) recycling the aqueous ammonium carbonate solution to step (i).

2. The process of claims 1 wherein the contacting step (i) is carried out at room temperature.

3. The process of claim 1 wherein the contacting with carbon dioxide gas in step (iii) is carried out at below about 35° C.

4. The process of claim 1 wherein the contacting with carbon dioxide gas in step (iii) is carried out in such a manner as to bring the liquid phase to a pH of from about 9 to about 9.5.

5. The process of claim 1 wherein the reaction between ammonium sulphate and calcium hydroxide in step (iii) is performed at from about 28° to about 32° C.

6. A process of regenerating and recovering lead from lead battery scrap which consists essentially of (i) contacting the lead battery scrap with an aqueous solution of ammonium carbonate to form lead carbonate and ammonium sulphate, (ii) subjecting the solid phase containing the lead carbonate obtained by solid-liquid separation of the reaction product so formed to roast-reduction at a temperature ranging from about 350° C. to about 700° C. in the presence of a carbon material reducing agent to generate and recover the lead, (iii) double decomposing the liquid phase containing the ammonium sulphate obtained by said solid-liquid separation by the addition of calcium hydroxide in an amount such that the molar ratio of the calcium hydroxide added, expressed as $Ca(OH)_2/(NH_4)_2SO_4$ is about 1.04 to about 1.90 and that the concentration of a calcium sulfate slurry formed as a by-product is about 5 to about 10%, and further contacting ammonium hydroxide thus formed, with carbon dioxide gas, to recover ammonium carbonate in a form of an aqueous solution for reuse in said contacting step (i), and (iv) recycling the aqueous ammonium carbonate solution of step (iii) to the step (i).

* * * * *

UNITED STATES PATENT AND TRADEMARK OFFICE
CERTIFICATE OF CORRECTION

PATENT NO. : 4,222,769
DATED : September 16, 1980
INVENTOR(S) : Masaaki OKUDA and Kiyotaka TOMISAKI It is certified that error appears in the above-identified patent and that said Letters Patent are hereby corrected as shown below:

Correct the spelling of Assignee's name from "Diamon Engineering Co., Ltd." to -- Diamond Engineering Co., Ltd."

Signed and Sealed this

Twenty-first Day of April 1981

[SEAL]

Attest:

RENE D. TEGTMEYER

Attesting Officer     Acting Commissioner of Patents and Trademarks